United States Patent
Bergman et al.

(10) Patent No.: US 9,867,145 B2
(45) Date of Patent: *Jan. 9, 2018

(54) POWER LEVEL OF TRANSMITTED CONTROL CHANNEL SYMBOL

(71) Applicant: Telefonaktiebolaget L M Ericsson (publ), Stockholm (SE)

(72) Inventors: Johan Mikael Bergman, Stockholm (SE); Håkan B. Björkegren, Täby (SE); Carmela Cozzo, San Diego, CA (US); Christer Edholm, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 91 days.

This patent is subject to a terminal disclaimer.

(21) Appl. No.: 13/661,864

(22) Filed: Oct. 26, 2012

(65) Prior Publication Data

US 2013/0051346 A1 Feb. 28, 2013

Related U.S. Application Data

(63) Continuation of application No. 12/520,161, filed as application No. PCT/SE2007/050989 on Dec. 13, 2007, now Pat. No. 8,369,260.

(30) Foreign Application Priority Data

Dec. 21, 2006 (SE) ...................... 0602805

(51) Int. Cl.
*H04W 52/32* (2009.01)
*H04W 52/16* (2009.01)
(Continued)

(52) U.S. Cl.
CPC ......... *H04W 52/325* (2013.01); *H04W 52/16* (2013.01); *H04W 52/262* (2013.01);
(Continued)

(58) Field of Classification Search
CPC . H04W 52/16; H04W 52/262; H04W 52/267; H04W 52/325; H04W 52/362; H04L 25/0202
See application file for complete search history.

(56) References Cited

U.S. PATENT DOCUMENTS 6,904,290 B1 * 6/2005 Palenius ............. H04W 52/265
455/422.1
8,369,260 B2 * 2/2013 Bergman et al. ............. 370/318
(Continued)

FOREIGN PATENT DOCUMENTS

WO     2006051481 A2     5/2006

OTHER PUBLICATIONS

Tsuzuki, F. et al., "Channel Estimation with Selective Superimposed Pilot Sequences under Fast Fading Environments", 2004 IEEE 60th Vehicular Technology Conference (VTC2004-Fall), vol. 1, Sep. 26, 2004, pp. 62-66, IEEE.

(Continued)

*Primary Examiner* — Joshua Kading
(74) *Attorney, Agent, or Firm* — Coats & Bennett, PLLC

(57) ABSTRACT

Channel estimation accuracy is improved by adjusting the power level of a physical control channel allocated to a receiver based on the transmission rate and/or transport format of a corresponding physical data channel allocated to the same receiver. The physical control channel may be a DPCCH, E-DPCCH or other type of physical control channel allocated to a receiver for facilitating uplink or downlink communication. In one embodiment, control channel symbols are transmitted for use in channel estimation by adjusting the power level of a physical control channel allocated to a receiver based on the transmission rate and/or transport format of a physical data channel allocated to the receiver (200). Control channel symbols are transmitted to the receiver over the physical control channel at the adjusted (Continued)

power level (202). The receiver uses the control channel symbols to perform channel estimation (204).

9 Claims, 3 Drawing Sheets

(51) Int. Cl.
 *H04W 52/36* (2009.01)
 *H04W 52/26* (2009.01)
 *H04L 25/02* (2006.01)
(52) U.S. Cl.
 CPC ....... *H04W 52/267* (2013.01); *H04W 52/362* (2013.01); *H04L 25/0202* (2013.01)

(56) References Cited

U.S. PATENT DOCUMENTS

| | | | |
|---|---|---|---|
| 2005/0047393 A1 | 3/2005 | Liu | |
| 2005/0083943 A1 | 4/2005 | Lee et al. | |
| 2006/0003787 A1* | 1/2006 | Heo et al. | 455/522 |
| 2006/0057978 A1 | 3/2006 | Love et al. | |
| 2006/0176814 A1 | 8/2006 | Yang et al. | |
| 2006/0176867 A1* | 8/2006 | Kwak | H04W 52/34 370/342 |
| 2006/0183428 A1* | 8/2006 | Heo | H04W 52/146 455/67.11 |
| 2006/0203780 A1 | 9/2006 | Terry | |
| 2006/0223543 A1* | 10/2006 | Usuda | H04W 52/267 455/450 |
| 2006/0268789 A1 | 11/2006 | Yu et al. | |
| 2007/0070926 A1 | 3/2007 | Bachi et al. | |
| 2007/0098115 A1 | 5/2007 | Bachi et al. | |
| 2007/0115871 A1 | 5/2007 | Zhang et al. | |
| 2007/0121554 A1* | 5/2007 | Luo et al. | 370/335 |
| 2007/0161394 A1* | 7/2007 | Kuroda | H04L 1/0015 455/522 |
| 2007/0286122 A1* | 12/2007 | Fonseca | 370/329 |
| 2008/0013499 A1 | 1/2008 | Ratasuk et al. | |
| 2008/0019305 A1 | 1/2008 | Dekorsy et al. | |
| 2008/0069035 A1* | 3/2008 | Pinheiro | H04L 47/10 370/328 |
| 2008/0144741 A1* | 6/2008 | Dominique et al. | 375/317 |
| 2010/0172295 A1* | 7/2010 | Sagfors | H04W 52/146 370/328 |
| 2011/0038305 A1* | 2/2011 | Mella et al. | 370/328 |

OTHER PUBLICATIONS

Hassibi, B. et al., "How Much Training is Needed in Multiple-Antenna Wireless Links?", IEEE Transactions on Information Theory, Apr. 1, 2003, pp. 951-963., vol. 49, No. 4, IEEE.

Delgado, C. et al., "Optimization of E-DCH Channel Power Ratios to Maximize Link Level Efficiency", Conference publication, 3rd International Symposium on Wireless Communications Systems, 2006 (ISWCS '06), Sep. 6, 2006, pp. 791-795, IEEE.

Femenias, G., "Reference-Based Dual Switch and Stay Diversity Systems Over Correlated Nakagami Fading Channels", Conference publication, IEEE Transactions on Vehicular Technology, Jul. 1, 2003, pp. 902-918, vol. 52, No. 4, IEEE.

3rd Generation Partnership Project, "3rd Generation Partnership Project; Technical Specification Group Radio Access Network; Physical layer procedures (FDD) (Release 6)", Technical Specification, 3GPP TS 25.214 V6.0.0, Dec. 1, 2003, pp. 1-64, 3GPP, France.

\* cited by examiner

POWER LEVEL OF TRANSMITTED CONTROL CHANNEL SYMBOL

RELATED APPLICATIONS

This application is a continuation of U.S. patent application Ser. No. 12/520,161 filed on Jun. 19, 2009, which is the U.S. National Application of PCT/SE2007/050989 filed on Dec. 13, 2007, which claims priority to SE0602805-4 filed on Dec. 21, 2006.

TECHNICAL FIELD

The present invention generally relates to channel estimation, and particularly relates to adjusting the power level of a physical control channel so that symbols received over the physical control channel can be reliably used to perform channel estimation regardless of data transmission rate.

BACKGROUND

The communication accuracy between a transmitter and receiver in a wireless communication network increases if the receiver can accurately estimate the channel, i.e., the signal propagation path(s) between the devices. Channel estimation is typically based at least in part on recovering known pilot symbols. For the uplink, Universal Mobile Telecommunications System (UMTS) specifies a Dedicated Channel (DCH) and an Enhanced Dedicated Channel (E-DCH), both corresponding to a set of separate channelization codes for data and associated control signaling. The number of data codes carrying the E-DCH and the spreading factors depend on the data rate used. An E-DCH Dedicated Physical Data Channel (E-DPDCH) carries the E-DCH transport channel. An E-DCH Dedicated Physical Control Channel (E-DPCCH) carries the control information associated with the E-DCH. Particularly, the E-DPCCH carries information of the transport block format (e.g., E-TFCI symbols), information for Hybrid Automatic Repeat-reQuest (ARQ) and scheduling. The control channel DPCCH carries the pilot and control symbols. The E-DPDCH and E-DPCCH channels may be multiplexed with the data channel (DPDCH) of the DCH which uses a 10 ms Transmission Time Interval (TTI) for circuit switched services.

As part of the High-Speed Packet Access (HSPA) evolution, higher order modulation schemes and higher data transmission rates are being implemented. Higher order modulation schemes such as 16QAM (Quadrature Amplitude Modulation) and above invariably result in reduced symbol spacing. Improved channel estimation is needed when higher order modulation is employed because symbol detection becomes more difficult when symbol spacing is reduced. Besides using the DPCCH symbols for channel estimation, channel estimation accuracy may be improved by using E-DPCCH symbols. At high data rates, E-DPDCH uses a high order modulation and is transmitted at high power. Conventional systems do not scale the power level of the DPCCH and E-DPCCH with respect to the data transmission rate. Accordingly, the symbols transmitted over the DPCCH and E-DPCCH become unreliable when higher-order modulation is used because the DPCCH and E-DPCCH symbols are drowned-out by the high power E-DPDCH. As such, the DPCCH and E-DPCCH cannot be used to obtain accurate channel estimates over a broad range of data transmission rates.

SUMMARY

According to the methods and apparatus taught herein, the power level of a physical control channel allocated to a receiver is adjusted based on the transmission rate and/or the transport format of a corresponding physical data channel allocated to the same receiver. In one embodiment, the E-DPCCH power level is adjusted based on E-DPDCH transmission rate and/or the transport format. In another embodiment, the DPCCH power level is adjusted based on E-DPDCH transmission rate and/or the transport format. The power level of still other types of physical control channels may be correspondingly adjusted. Regardless, the power level of the physical control channel is optimized as a function of data transmission rate and/or the transport format.

This way, the receiver can reliably use control symbols transmitted via at least one of the physical control channels to perform channel estimation across a wide range of data transmission rates. In one embodiment, the control channel power level is adjusted based on the modulation scheme of the corresponding physical data channel. In another embodiment, the power level of the control channel is adjusted based on the transport block size of the physical data channel. Regardless, at high data transmission rates, increasing the power level of the control channel increases channel estimation accuracy. This in turn improves demodulation performance at high data rates. The power level of the control channel can be increased up to a level that ensures reliable channel estimation. Further increase may cause degradation in uplink/downlink capacity. At low data rates, the power level of the control channel is decreased low enough to improve uplink/downlink capacity yet remains high enough to constructively aid in channel estimation. Also, adjusting the control channel power level based on data transmission rate and/or transport format reduces the amount of interference injected into the data channel from the control channel.

In one embodiment, the power level of a physical control channel allocated to a receiver is adjusted based on a transmission rate and/or transport format of a physical data channel allocated to the receiver. Control channel symbols are transmitted to the receiver over the physical control channel at the adjusted power level. The receiver uses the control channel symbols to perform channel estimation.

Of course, the present invention is not limited to the above features and advantages. Those skilled in the art will recognize additional features and advantages upon reading the following detailed description, and upon reviewing the accompanying drawings.

DETAILED DESCRIPTION

Figure 1:
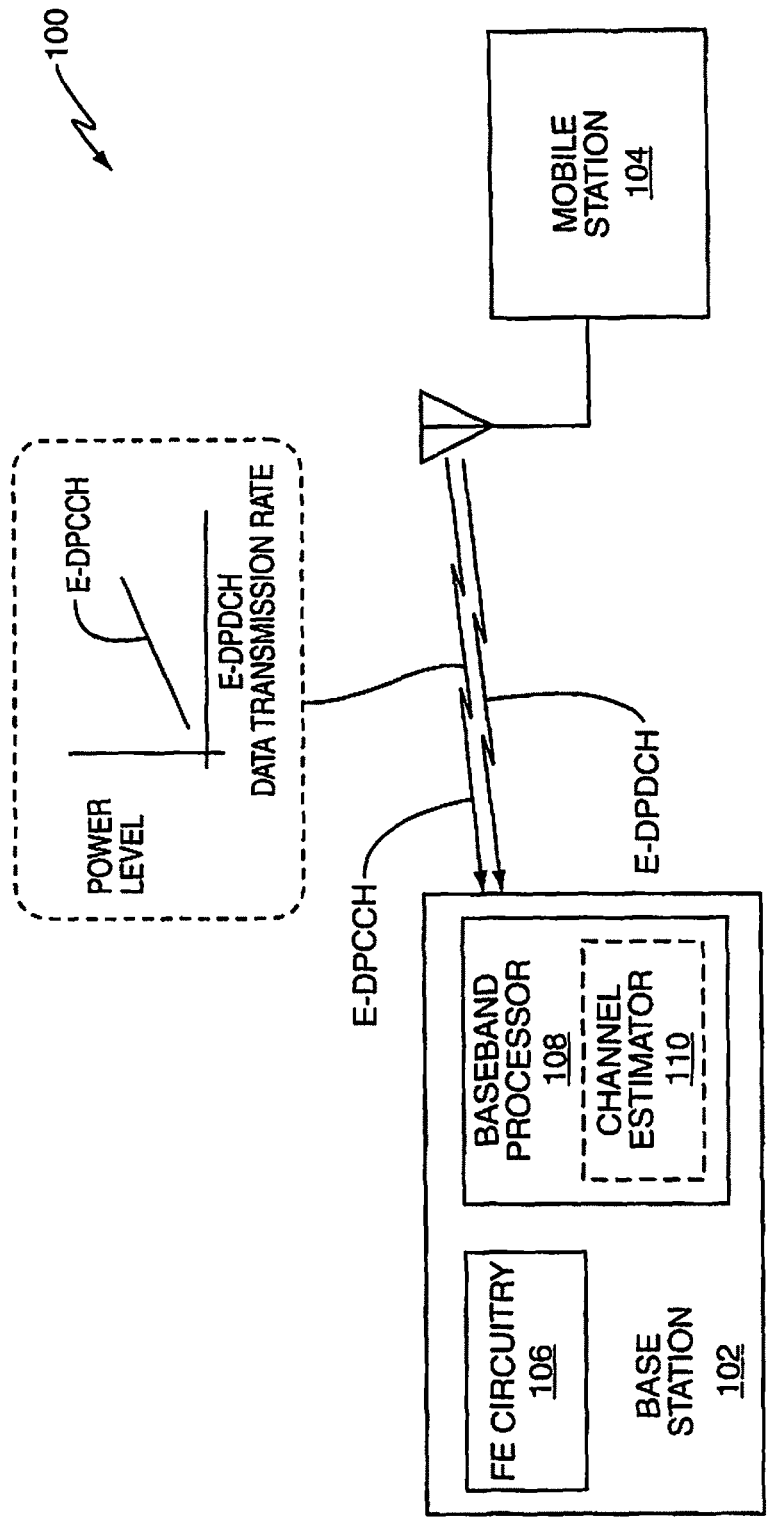
FIG. 1 is a block diagram of an embodiment of a receiver including a baseband processor operable to perform channel estimation based at least in part on control channel symbols received from a physical control channel having an adjustable power level.

FIG. 1 illustrates an embodiment of a wireless communication system 100 including a radio base station 102 and a mobile station 104. The wireless communication system 100 supports both uplink communication (mobile station to base station) and downlink communication (base station to mobile station). Operation of the wireless communication system 100 is described next with reference to uplink communication. However, those skilled in the art will readily recognize that the control channel power adjustment embodiments disclosed herein can apply to both the downlink and uplink direction. As such, the term "receiver" as used herein means the mobile station 104 for downlink communication and the radio base station 102 for uplink communication. Likewise, the term "transmitter" as used herein means the radio base station 102 for downlink communication and the mobile station 104 for uplink communication.

With this understanding, one or more dedicated channels such as a DCH and/or an E-DCH are allocated between the mobile station 104 and base station 102 for supporting uplink communication with the mobile station 104. In one embodiment, an E-DPDCH is allocated for carrying the E-DCH transport channel. A corresponding E-DPCCH carries control information to the base station 102. The E-DPDCH and E-DPCCH are multiplexed with DPCCH (and DPDCH) channels of a DCH also allocated between the mobile station 104 and base station 102. Alternatively, only a DCH is allocated between the base station 102 and mobile station 104. In yet another embodiment, other types of physical data and control channels are allocated for supporting downlink/uplink communication.

Figure 2:
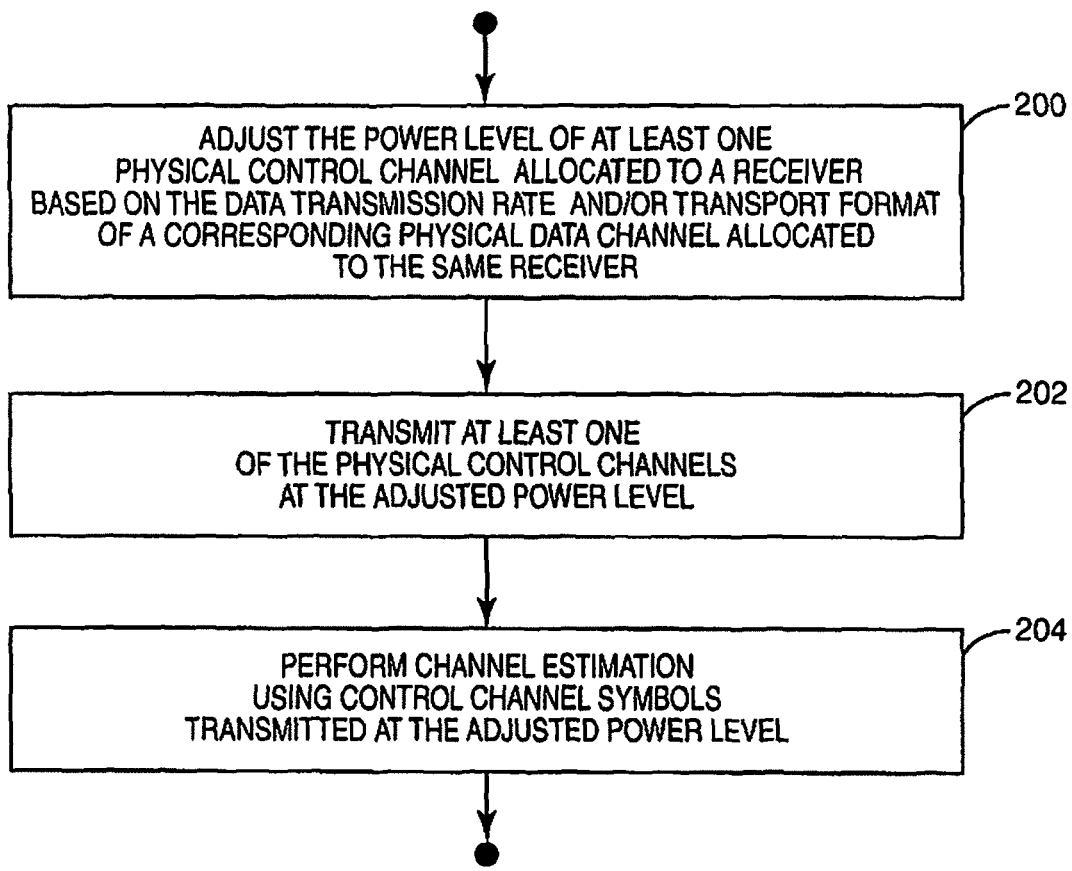
FIG. 2 is a logic flow diagram of an embodiment of processing logic for performing channel estimation using control channel symbols received from a physical control channel having an adjustable power level.

Regardless, the power level of the physical control channel is adjusted between the mobile station 104 and base station 102 based on the transmission rate and/or transport format of the corresponding data channel, e.g., as illustrated by Step 200 of FIG. 2. For example, the control channel power level may increase responsive to an increase in the transmission rate of the physical data channel. Contrarily, the control channel power may decrease responsive to a decrease in the transmission rate of the data channel. Similarly, the control channel power may be adjusted responsive to changes in the transport format of the data channel such as changes in the modulation scheme and/or transport block size.

If the DPCCH power level is modified, it will have an impact on the received Signal-to-Interference ratio (SIR) experienced at the base station 102. This, in turn, affects the power control loop. Accordingly, the base station 102 adjusts the SIR target for the power control loop. Mainly, the E-DCH Transport Format Combination Identifier (E-TFCI) provides information to the base station 102 about the transmitted modulation scheme employed at the mobile station 104. The base station 102 uses the E-TFCI information to modify the SIR target when performing DPCCH power level adjustments. Adjusting the power level of the E-DPCCH has less effect on the received SIR because the E-DPCCH may be transmitted less frequently than the DPCCH. Despite this nuance associated with the DPCCH, there are various ways to adjust the power level of the DPCCH or any other type of physical control channel.

The power level of the physical control channel may be linearly adjusted based on the transmission rate and/or transport format of the corresponding data channel as shown in FIG. 1. In a WCDMA embodiment, the E-DPCCH power level is linearly adjusted based on the transport block size of the corresponding E-DPDCH. E-DPCCH power may be linearly adjusted in a manner similar to how the E-DPDCH power level is scaled based on its transport block size as described in the document 3GPP TS25.214 "Physical layer procedures (FDD)" issued by the 3rd Generation Partnership Project. Linearly adjusting the control channel power level based on transport block size results in an SIR estimate that ensures a $E_b/N_O$ that holds relatively constant for all data transmission rates, where $E_b$ is the energy per bit and $N_O$ is the noise power spectral density. In turn, bit error rate (BER) performance is not adversely affected when different transport block sizes and/or modulation schemes are used.

Figure 3:
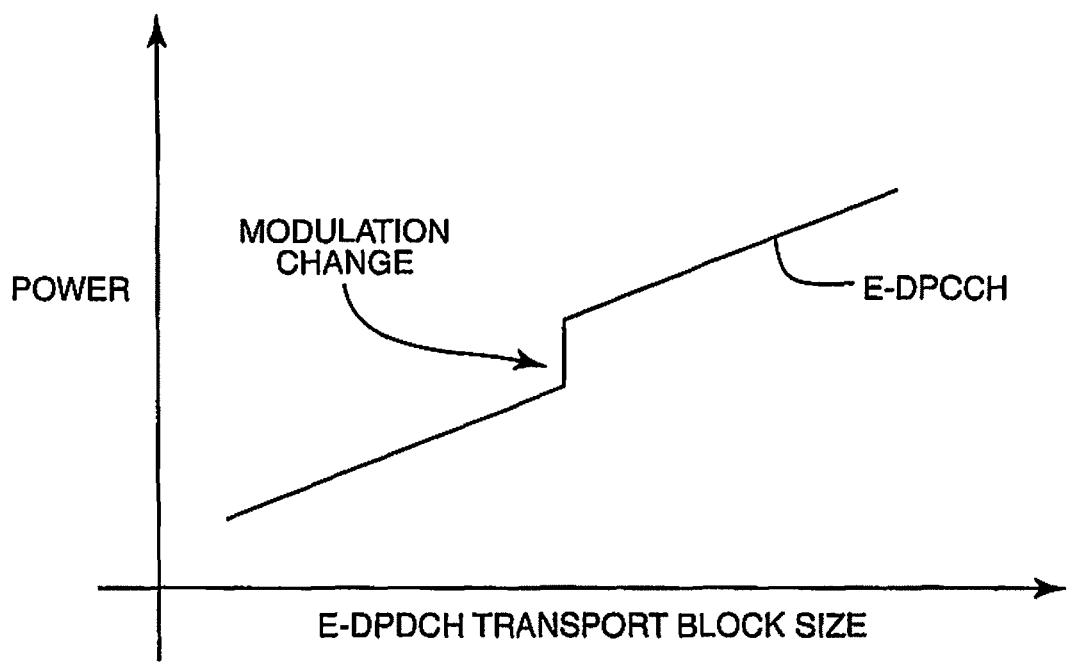
FIG. 3 is a plot diagram illustrating an embodiment of a physical control channel having an adjustable power level.

Instead of linearly adjusting the power level of the physical control channel, it can be non-linearly adjusted. In one embodiment, control channel power is adjusted based on the modulation scheme of the corresponding physical data channel. This way, control channel power can be non-linearly adjusted in a stepwise or other non-linear manner responsive to changes in the modulation scheme as shown in FIG. 3. For example, the control channel power may be stepped-up or ramped-up when the data modulation order increases, e.g., from QPSK to 16-QAM or higher. When channel conditions warrant, the data channel modulation scheme may be subsequently decreased to a lower-capacity modulation scheme for reducing signal transmission errors. In response, the control channel power is correspondingly stepped or ramped down.

In yet another embodiment, the power level of more than one physical control channel allocated to the mobile station 104 may be adjusted. In one embodiment, the power level of both an E-DPCCH and DPCCH are adjusted based on the transmission rate and/or transport format of their corresponding data channels. Each control channel may be adjusted using the same or different (e.g., linear/non-linear) function for different ranges of transport block sizes and/or modulation schemes.

After power scaling is performed, control channel symbols are transmitted to the radio base station 102 over the physical control channel at the adjusted power level, e.g., as illustrated by Step 202 of FIG. 2. The base station 102 uses the control channel symbols to perform channel estimation, e.g., as illustrated by Step 204 of FIG. 2. In one embodiment, front-end circuitry 106 filters, down-converts and digitizes received data and control signals into corresponding baseband signal streams. A baseband processor 108 extracts the control channel symbols from the baseband signal streams. A channel estimator 110 included in or associated with the baseband processor 108 uses the extracted control channel symbols to perform channel estimation as is well known in the art. The baseband processor 108 detects and decodes transmitted data symbols based on the channel estimation results and other parameters such as combining weights as is well known in the art.

Adjusting control channel power according to any of the various embodiments described herein improves channel estimation accuracy in that the symbols received from the control channel can be used to perform channel estimation despite varying data transmission rate, modulation scheme and/or transport block size. At high data rates, control channel power increases so that high-power symbols are available for channel estimation. To the contrary, control channel power decreases at low data rates so that power is not unnecessarily consumed on the control channel, reducing interference on the data channel. However, control symbols can still be received from the physical control channel and used for channel estimation at low data transmission rates.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of transmitting symbols used for channel estimation, comprising:

adjusting the power level of an enhanced dedicated physical control channel allocated for control transmissions to a receiver responsive to at least a transport format of an enhanced dedicated physical data channel allocated to the receiver by adjusting the power level of the enhanced dedicated physical control channel in response to a change in at least the transport format of the enhanced dedicated physical data channel; and transmitting control channel symbols to the receiver over the enhanced dedicated physical control channel at the adjusted power level for use by the receiver in performing channel estimations;

wherein adjusting the power level of the enhanced dedicated physical control channel comprises increasing the power level of the enhanced dedicated physical control channel in response to an increase in the transport format of the enhanced dedicated physical data channel.

2. The method of claim 1, wherein adjusting the power level of the enhanced dedicated physical control channel further comprises:

decreasing the power level of the enhanced dedicated physical control channel in response to a decrease in the transport format of the enhanced dedicated physical data channel.

3. The method of claim 1, wherein transmitting the control channel symbols to the receiver over the enhanced dedicated physical control channel at the adjusted power level comprises transmitting the control channel symbols to the receiver over an uplink enhanced dedicated physical control channel at the adjusted power level.

4. A transmitter comprising a baseband processor configured to:

adjust the power level of an enhanced dedicated physical control channel allocated for control transmissions to a receiver responsive to at least a transport format of an enhanced dedicated physical data channel allocated to the receiver by adjusting the power level of the enhanced dedicated physical control channel in response to a change in at least the transport format of the enhanced dedicated physical data channel; and transmit control channel symbols to the receiver over the enhanced dedicated physical control channel at the adjusted power level for use by the receiver in performing channel estimations;

wherein the baseband processor adjusts the power level of the enhanced dedicated physical control channel by increasing the power level of the enhanced dedicated physical control channel in response to an increase in the transport format of the enhanced dedicated physical data channel.

5. The transmitter of claim 4, wherein the baseband processor is further configured to:

decrease the power level of the enhanced dedicated physical control channel in response to a decrease in the transport format of the enhanced dedicated physical data channel.

6. The transmitter of claim 4, wherein the baseband processor is configured to transmit the control channel symbols to the receiver over an uplink enhanced dedicated physical control channel at the adjusted power level.

7. A receiver comprising a baseband processor configured to:

detect control channel symbols received from an enhanced dedicated physical control channel allocated to the receiver, said control channel symbols having been transmitted to the receiver via the enhanced dedicated physical control channel at a power level increased in response to an increase in a transport format of an enhanced dedicated physical data channel allocated for data transmissions to the receiver; and perform channel estimation using at least the detected control channel symbols.

8. The receiver of claim 7, wherein the baseband processor is configured to detect control channel symbols received from an uplink enhanced dedicated physical control channel.

9. A method of performing channel estimation at a receiver, comprising:

detecting control channel symbols received from an enhanced dedicated physical control channel allocated to the receiver, said control channel symbols having been transmitted to the receiver via the enhanced dedicated physical control channel at a power level increased in response to an increase in a transport format of an enhanced dedicated physical data channel allocated for data transmissions to the receiver; and performing channel estimation using at least the detected control channel symbols.

* * * * *